United States Patent
Kobayashi et al.

(10) Patent No.: US 6,879,064 B2
(45) Date of Patent: Apr. 12, 2005

(54) LINEAR MOTOR AND LINEAR-MOTOR BASED COMPRESSOR

(75) Inventors: Masanori Kobayashi, Fujisawa (JP); Ichiro Kita, Fujisawa (JP); Ichiro Morita, Fujisawa (JP); Ko Inagaki, Fujisawa (JP); Akira Inoue, Fujisawa (JP)

(73) Assignee: Matsushita Refrigeration Company (JP)

( * ) Notice: Subject to any disclaimer, the term of this patent is extended or adjusted under 35 U.S.C. 154(b) by 55 days.

(21) Appl. No.: 10/628,582

(22) Filed: Jul. 28, 2003

(65) Prior Publication Data

US 2004/0066097 A1 Apr. 8, 2004

(30) Foreign Application Priority Data

Jul. 26, 2002 (JP) .................................. 2002-217879

(51) Int. Cl.[7] .............................................. H02K 41/10
(52) U.S. Cl. .............................. 310/12; 310/13; 310/15; 417/44; 417/363
(58) Field of Search ............................... 310/12, 13, 14; 417/44, 363

(56) References Cited

U.S. PATENT DOCUMENTS

| | | | | |
|---|---|---|---|---|
| 6,084,320 A | * | 7/2000 | Morita et al. | 310/12 |
| 6,626,651 B2 | * | 9/2003 | Akazawa | 417/417 |
| 6,809,434 B1 | * | 10/2004 | Duncan et al. | 310/12 |
| 6,812,597 B2 | * | 11/2004 | McGill et al. | 310/12 |

FOREIGN PATENT DOCUMENTS

JP  11-313476  11/1999

* cited by examiner

Primary Examiner—Darren Schuberg
Assistant Examiner—Iraj A. Mohandesi
(74) Attorney, Agent, or Firm—Rossi, Kimms & McDowell

(57) ABSTRACT

A linear motor includes an outer yoke formed of a core made of thin magnetic plates laminated and a coil, an inner yoke formed of a core made of thin magnetic plates laminated and permanent magnets rigidly stuck on this laminated core, and an output shaft fixed to the inner yoke.

4 Claims, 3 Drawing Sheets

LINEAR MOTOR AND LINEAR-MOTOR BASED COMPRESSOR

FIELD OF THE INVENTION

The present invention relates in general to motors. Specifically, the present invention relates to a linear motor and a linear-motor based compressor.

BACKGROUND OF THE INVENTION

FIG. 4 shows a sectional view of a conventional linear motor disclosed in Japanese Patent Application Non-Examined Publication No. H11-313476. FIG. 5 shows a sectional view taken along the line 5—5 of FIG. 4.

Inner yoke 1 is formed by laminating a number of thin plates 2, each one of which has a high magnetic permeability and is in generally rectangular shape, into a prism. Outer yoke 3 is formed by laminating a number of thin plates 2, each one of which has a high magnetic permeability and slots 5, 6, and is in generally rectangular shape, into a prism. Coil 10 is wound on center magnetic pole 8, so that three magnetic poles 7, 8, 9 are formed. Inner yoke 1 and outer yoke 3 are apart from each other at a given gap 12 in between, and are fixed on yoke-block 11.

Movable section 14 is formed of a pair of permanent magnets 15, 16 disposed in gap 12, supporter 17 for supporting the permanent magnets, and output shaft 18. Permanent magnets 15, 16 are magnetized in different polarities from each other in the direction facing to outer yoke 3. Bearing 19 allows shaft 18 to reciprocate axially, and supports shaft 18 with the spin of shaft 18 regulated.

A flow of AC current through coil 10 generates an AC magnetic pole such as N-S-N or S-N-S in magnetic poles 7, 8, 9 of outer yoke 3. Magnetic attraction and repulsion between this AC magnetic pole and permanent magnets 15, 16 reciprocates movable section 14 axially.

In the foregoing structure; however, permanent magnets 15, 16 are supported only by supporter 17, so that movable section 14 is possibly deformed by magnetic force applied to the permanent magnets. Further, since there are air gaps on both sides of the permanent magnets, the magnetic fluxes of the permanent magnets are reduced.

SUMMARY OF THE INVENTION

The present invention aims to solve the foregoing problem. A linear motor of the present invention includes an outer yoke and an inner yoke, and both the yokes are formed by laminating magnetic thin plates. The outer yoke forms a fixed section of the linear motor, and the inner yoke forms a movable section of the linear motor and is fixed to an output shaft. Permanent magnets are rigidly mounted to the inner yoke.

The inner yoke fixed to the output shaft has high rigidity, so that the movable section is not deformed by attraction force of the permanent magnets, or thrust force as well as inertia force in reciprocating motion. This structure produces the following advantages:

(1) Friction or collision between the movable section and the fixed section is prevented, so that the reliability of the linear motor increases.
(2) A gap between the inner yoke and the outer yoke can be smaller, so that magnetic flux of the permanent magnets increases and the motor works more efficiently. The permanent magnet can be downsized, which possibly downsizes the linear motor and reduces the cost.

BRIEF DESCRIPTION OF THE DRAWINGS

The invention will be described with reference to certain preferred embodiments thereof along with the accompanying figures, wherein.

DETAILED DESCRIPTION OF PREFERRED EMBODIMENT

Exemplary embodiments of the present invention are demonstrated hereinafter with reference to the accompanying drawings. Similar elements to the conventional one have the same reference marks and the detailed descriptions thereof are omitted here.

First Exemplary Embodiment

Figure 1:
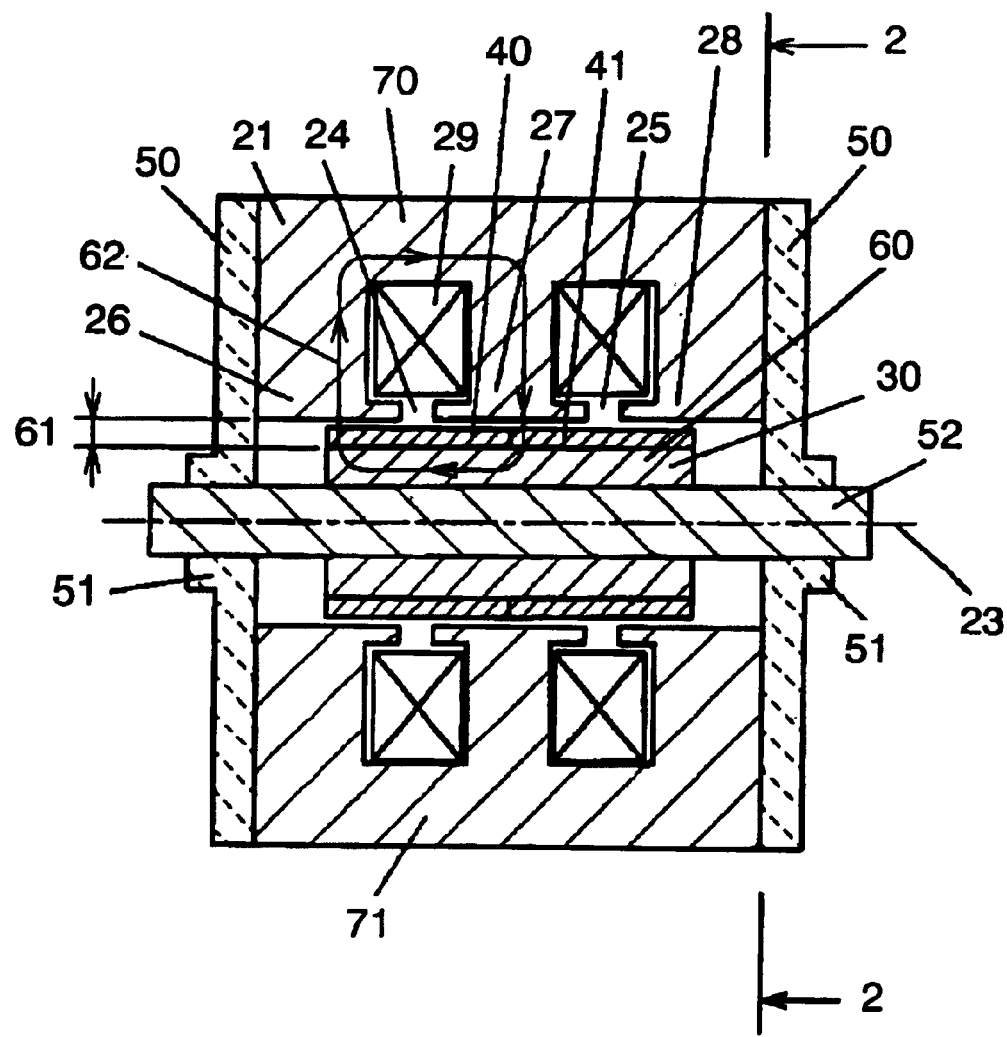
FIG. 1 shows a sectional view of a linear motor of the present invention.
Figure 2:
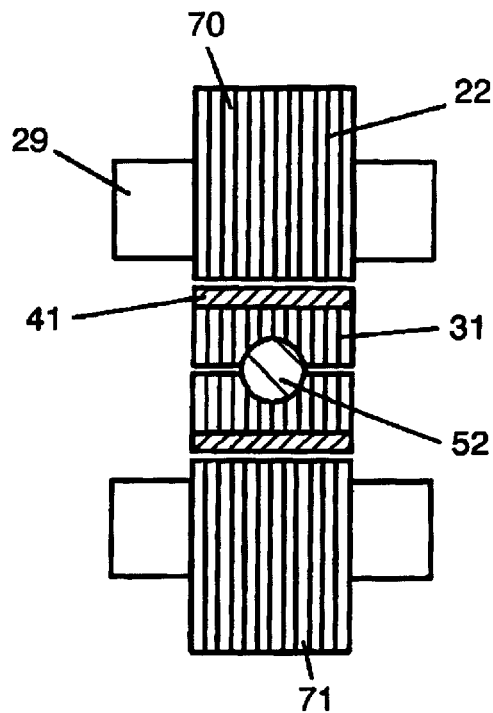
FIG. 2 shows a sectional view taken along line 2—2 of FIG. 1.

FIG. 1 shows a sectional view of a linear motor of the present invention, and FIG. 2 shows a sectional view taken along line 2—2 of FIG. 1.

Outer yoke 21 is formed by laminating a number of thin plates 22 into a prism. Each one of thin plates 22 has slots 24, 25 and has high permeability. Coil 29 is wound on center magnetic pole 27, so that three magnetic poles 26, 27, 28 are formed. Inner yoke 30 is formed by laminating a number of thin plates 31 of high permeability into a prism. Plate 31 is desirably coated with insulating film on its surface and has characteristics of high saturation magnetic-flux density and low iron loss. Both of thin plates 22 and thin plates 31 are laminated such that the laminated faces are piled up along the magnetic line of force of the permanent magnets.

A pair of flat plate-like permanent magnets 40, 41 are magnetized in the direction facing to outer yoke 21 in different polarities from each other. Magnets 40, 41 are desirably made of rare-earth magnet having large coersive force such as Nd—Fe—B based magnets.

Base 50 fixes outer yoke 21 thereto, and bearing 51 disposed in base 50 allows output shaft 52 to reciprocate axially and supports shaft 52 with the spin of shaft 52 regulated. Base 50 and shaft 52, which contact inner yoke 30 and outer yoke 21, are made from a nonmagnetic material having a larger enough electric resistance than iron such as stainless-steel, so that they do not adversely affect the magnetic paths of inner yoke 30 or outer yoke 21.

Outer yoke 21 is a major part of the fixed section of the linear motor, and movable section 60 of the linear motor includes inner yoke 30, permanent magnets 40, 41, and output shaft 52. Inner yoke 30 faces the surface of outer yoke 21 at a given gap 61 in between. Flat plate-like permanent magnets 40, 41 are rigidly mounted on the surface of inner yoke 30, which is fixed to output shaft 52. Magnetic flux 62 is generated from permanent magnets 40 and 41. Since magnets 40, 41 and inner yoke 30 have flat faces, they can be solidly stuck to each other with ease. Flat plate-like magnets 40, 41 are also manufactured with ease.

In this embodiment, a set of an outer yoke and an inner yoke is called a linear-motor assembly. The linear motor shown in FIGS. 1 and 2 thus has two linear-motor assemblies 70 and 71. Two inner yokes of the two linear-motor assemblies are fixed to output shaft 52 commonly shared by the two inner yokes. First linear-motor assembly 70 includes outer yoke 21, permanent magnets 40, 41 and inner yoke 30. Second linear-motor assembly 71 has the same construction as the first one, and is placed symmetrically to the first one with respect to output shaft 52. Magnets 40, 41 of first assembly 70 are magnetically attracted by outer yoke 21, so that output shaft 52 is attracted toward outer yoke 21. However, since second assembly 71 and the first one are placed symmetrically with respect to shaft 52, the same attraction force but in the opposite direction to the foregoing attraction works on shaft 52, so that the two attraction forces cancel out. In other words, two or more linear-motor assemblies are placed at an equivalent angle to each other so that lateral magnetic attraction forces applied to the output shaft cancel out.

An operation of the linear motor having the foregoing structure is demonstrated hereinafter:

(1) As shown in FIG. 1, magnetic flux 62 is generated in permanent magnets 40, 41, so that static magnetic field is formed in gap 61;

(2) An AC current is supplied through coil 29 wound on center magnetic pole 27 of outer yoke 21, so that AC magnetic poles are generated in magnetic poles 26, 27, and 28 of outer yoke 21; and (3) Magnetic attraction/repulsion between the AC magnetic poles in outer yoke 21 and permanent magnets 40, 41 generates thrust force proportionate to the AC current and the magnetic-flux density of the permanent magnets. As a result, movable section 60 reciprocates in synchronization with the frequency of the AC current.

Movable section 60 is equipped with permanent magnets 40, 41 solidly stuck to the surface of inner yoke 30, and movable section 60 has thus high rigidity. Therefore, movable section 60 is not deformed or damaged by the thrust force or inertia force in reciprocating. This structure produces the following advantages:

(1) Friction or collision between the movable section and the fixed section is prevented, so that the reliability of the linear motor increases; and (2) A gap between the inner yoke and the outer yoke can be smaller, so that magnetic flux of the permanent magnets increases and the motor works more efficiently. The permanent magnet can be downsized, which possibly downsizes the linear motor and reduces the cost.

In this embodiment, the inner yoke is referred to as the fixed section, and the outer yoke is referred to as the moving section; however, another structure, in which the inner yoke works as the fixed section and the outer yoke works as the movable section, can also produce the same advantages.

In this embodiment, the outer yoke has three magnetic poles; however, the number of poles can be four or more, and coils are wound on at least two poles. This structure produces the same advantages.

Outer yoke 21 used in this embodiment is formed by winding coil 29 on center magnetic pole 27, and this method is easier to assemble the linear motor than another method, where an outer yoke is formed by laminating thin plates radially with respect to the output shaft.

Second Exemplary Embodiment

Figure 3:
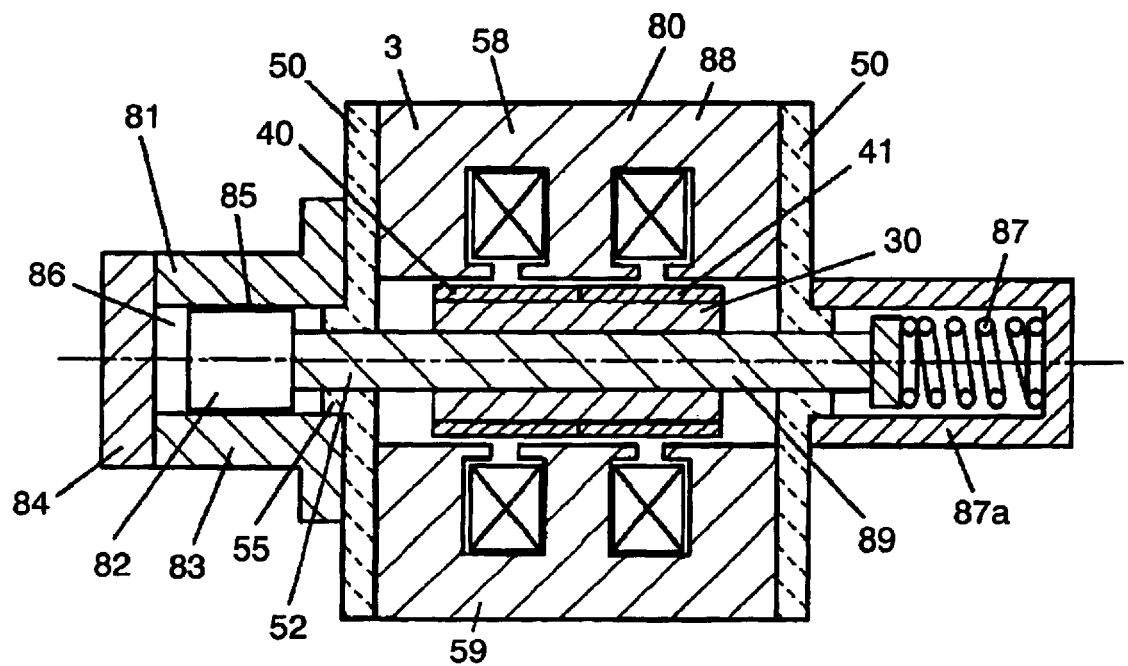
FIG. 3 shows a sectional view of a linear-motor based compressor of the present invention.
Figure 4:
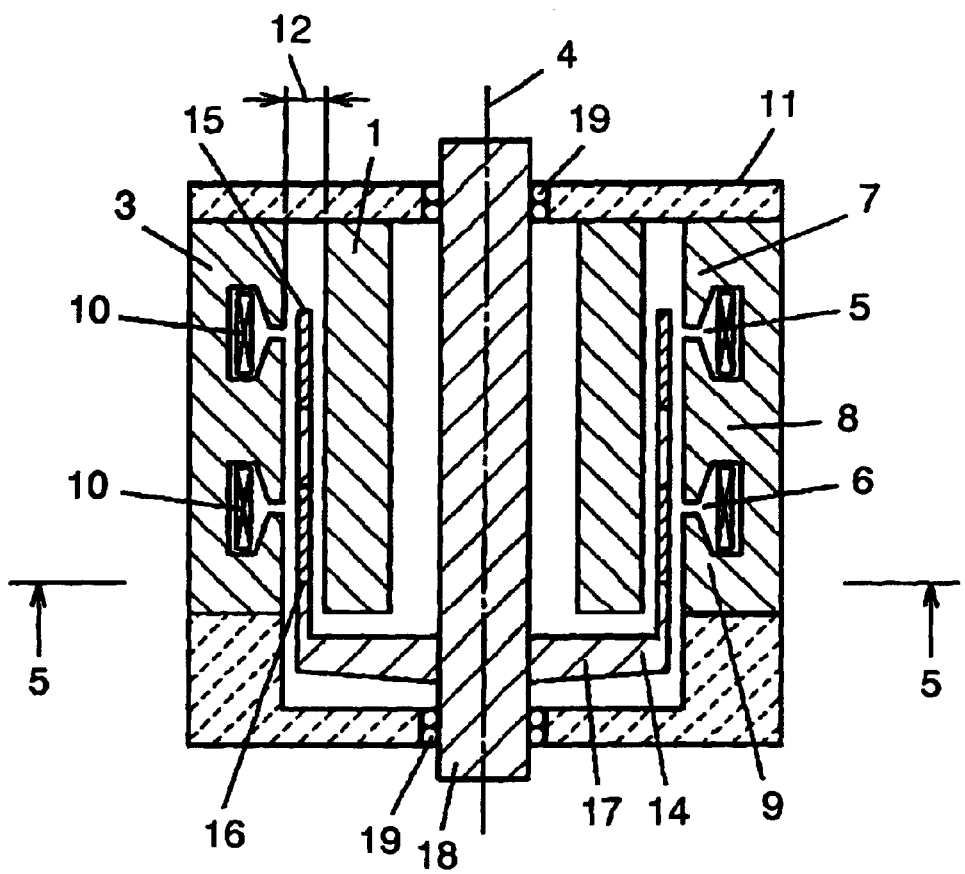
FIG. 4 shows a sectional view of a conventional linear motor.
Figure 5:
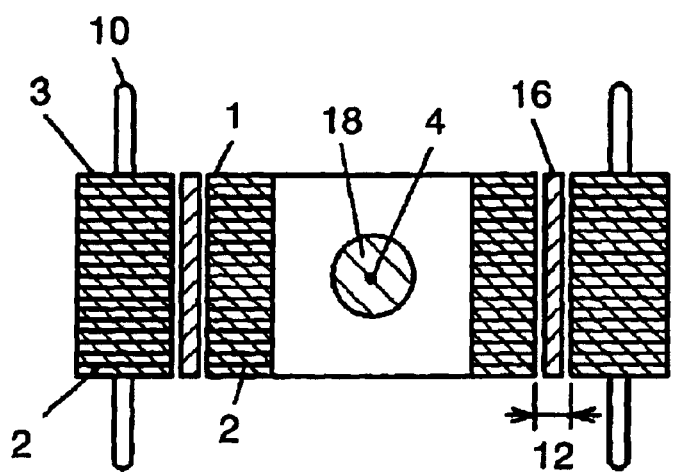
FIG. 5 shows a sectional view taken along line 5—5 of FIG. 4.

FIG. 3 shows a vertical cross section of a linear-motor based compressor in accordance with the second exemplary embodiment of the present invention. A construction of linear motor 80 has been described in the first embodiment.

Compressor mechanism 81 comprises the following elements:

piston 82 fixed to output shaft 52;

cylinder 83 engaged with piston 82 so that cylinder can reciprocate, and fixed to base 50; and cylinder head 84 fixed to cylinder 83.

Compressor mechanism 81 further includes sliding section 85 between piston 82 and cylinder 83, and compressing chamber 86 which is formed of the following elements:

piston 82;

cylinder 83; and cylinder head 84.

Resonant spring 87 is attached to fixed section 88 via spring enclosure 87a at its first end, and its second end is attached to movable section 89, where fixed section 88 includes outer yoke 3 and cylinder 83, and movable section 89 includes output shaft 56 and piston 82. Resonant spring 87 is adjusted such that its resonance frequency substantially agrees with the driving frequency of linear motor 80, where the resonance frequency is determined by the masses of fixed section 88 and movable section 89 and a spring constant of resonant spring 87.

The liner-motor compressor having the foregoing structure and equipped with the linear motor operates in the following way: Supply of an AC current to linear motor 80 prompts movable section 89 to reciprocate with respect to fixed section 88, thereby compressing coolant gas sucked into compressing chamber 86 sequentially and discharging the gas to a freezing cycle externally prepared. In this case, movement of movable section 89 from a neutral point to a top dead center or a bottom dead center increases deformation of spring 87, and acceleration is applied to movable section 89 in the inverse direction. In this case, at the top and bottom dead points, the speed of movable section 89 becomes zero (0), and spring 87 stores the max. energy. The movement of movable section 89 returning to the neutral point again decreases the deformation of spring 87, so that the energy stored in spring 87 is converted into a speed of movable section 89.

A substantial agreement of the power-supply frequency with the resonance frequency synchronizes a cycle of the displacement of movable section 89 with a cycle of the acceleration from spring 87, where the resonance frequency is determined by the masses of fixed section 88 and movable section 89 and the spring constant of resonant spring 87. As a result, an energy loss can be reduced, and movable section 89 can efficiently reciprocates.

In this case, piston 82 in cylinder 83 slides at a high speed with respect to sliding section 85. Permanent magnets 40, 41 and the inner yoke used in linear motor 80 have high rigidity and attraction forces are balanced, so that the output shaft 52 is not deformed and the action force is not generated other than the axial direction. Therefore, piston 82 fixed coaxially to output shaft 52 in cylinder 83 can slide reciprocally free from an abnormal pinch on sliding section 85. This structure allows reducing friction at the sliding section of the compressor mechanism, and preventing the reliability from lowering due to excessive heat generation or friction increment, or the efficiency from lowering due to increment of sliding loss.

The invention has been described with reference to certain preferred embodiments thereof. It will be understood, however, that modifications and variations are possible within the scope of the appended claims.

What is claimed is:

1. A linear motor comprising:
   (a) an outer yoke forming a fixed section of the linear motor and including:
      (a-1) a laminated core formed by laminating thin magnetic plates, each one of the plates having a plurality of slots;
      (a-2) a coil wound in the plurality of slots
      wherein supply of an electric current though the coil produces at least three magnetic poles on a surface of the outer yoke,
   (b) an inner yoke facing the outer yoke at a given gap in between and including:
      (b-1) a laminated core formed by laminating thin magnetic plates;
      (b-2) a permanent magnet rigidly stuck to the laminated core of the inner yoke, and
   (c) an output shaft,
   wherein the inner yoke is rigidly mounted to the output shaft and forms a movable section of the linear motor wherein the permanent magnet shapes in a flate-plate.

2. The linear motor of claim 1, wherein at least two linear-motor assemblies are disposed at an equal angle around the output shaft commonly shared by the assemblies.

3. The linear motor of claim 1, wherein at least one of the output shaft and the fixed section, which contacts the outer yoke, of the linear motor is made of non-magnetic material.

4. A linear-motor based compressor comprising:
   (i) a linear motor including:
      (a) an outer yoke forming a fixed section of the linear motor and including:
         (a-1) a laminated core formed by laminating thin magnetic plates, each one of the plates having a plurality of slots;
         (a-2) a coil wound in the plurality of slots
         wherein supply of an electric current though the coil produces at least three magnetic poles on a surface of the outer yoke,
      (b) an inner yoke facing the outer yoke at a given gap in between and including:
         (b-1) a laminated core formed by laminating thin magnetic plates;
         (b-2) a permanent magnet rigidly stuck to the laminated core of the inner yoke, and
      (c) an output shaft,
      wherein the inner yoke is rigidly mounted to the output shaft and forms a movable section of the linear motor;
   (ii) a compressor mechanism including a cylinder and a piston, wherein the cylinder is mounted to the fixed section of the linear motor and forms a fixed section of the linear-motor based compressor, and the piston is linked to the output shaft of the linear motor and forms of a movable section of the linear-motor based compressor;
   (iii) a resonant spring disposed between the fixed section and the movable section of the linear-motor based compressor,
   wherein the linear-motor wherein the permanent magnet shapes in a flate-plate based compressor is driven by a frequency around a resonance frequency that is determined by masses of the fixed section and the movable section of the linear-motor based compressor and a spring constant of the resonant spring.

* * * * *